United States Patent [19]
Kim

[11] Patent Number: 6,052,713
[45] Date of Patent: Apr. 18, 2000

[54] TECHNIQUE FOR TRANSMITTING/ STORING MULTI SUB DATA

[75] Inventor: Hyun-Ju Kim, Seoul, Rep. of Korea

[73] Assignee: SamSung Electronics Co., Ltd., Kyungki-do, Rep. of Korea

[21] Appl. No.: 08/855,496

[22] Filed: May 13, 1997

[30] Foreign Application Priority Data

May 13, 1996 [KR] Rep. of Korea ............... 96-15792

[51] Int. Cl.$^7$ ............................ G06F 13/00
[52] U.S. Cl. ............................ 709/213
[58] Field of Search ............ 395/200.62, 200.45, 395/200.43, 200.44; 709/239, 215, 213, 214

[56] References Cited

U.S. PATENT DOCUMENTS

| | | | |
|---|---|---|---|
| 5,010,482 | 4/1991 | Keller et al. | 710/52 |
| 5,283,869 | 2/1994 | Adams et al. | 709/237 |
| 5,530,848 | 6/1996 | Gilbert et al. | 709/303 |
| 5,537,639 | 7/1996 | Matsumoto et al. | 709/232 |
| 5,576,945 | 11/1996 | McCline et al. | 700/2 |
| 5,617,537 | 4/1997 | Yamada et al. | 709/214 |
| 5,621,753 | 4/1997 | Weber | 375/202 |

OTHER PUBLICATIONS

Sivarama Dandamudi et al.; A Hierarchical Task Queue Organization for Shared–Memory Multiprocessor Systems; IEEE Transactions on Parallel and Distributed Systems; vol. 6, No. 1; pp. 1–16, Jan. 1995.

*Primary Examiner*—Kenneth Coulter
*Attorney, Agent, or Firm*—Robert E. Bushnell, Esq.

[57] ABSTRACT

A data transmitting/storing device having a single main processor includes: a plurality of sub processors; a ready queue for temporarily keeping given data waiting in sequence; a buffering processor for separating only pure without headers data from the given data; a control processor for temporarily keeping waiting sub data transmitted from sub processors in the ready queue, and reading out the waiting sub data in transmission sequence, thereby providing the buffering processor with the readout sub data; a disk for storing data thereon; a storing processor for classifying and storing on the disk only pure data separated by the buffering process of the sub processors.

4 Claims, 5 Drawing Sheets

TECHNIQUE FOR TRANSMITTING/STORING MULTI SUB DATA

CLAIM OF PRIORITY

This application makes reference to, incorporates the same herein, and claims all benefits accruing under 35 U.S.C. §119 from an application for DEVICE AND METHOD FOR TRANSMITTING/STORING MULTI SUB DATA earlier filed in the Korean Industrial Property Office on the 13$^{th}$ day of May 1996 and there duly assigned Serial No. 15792/1996, a copy of which application is annexed hereto.

BACKGROUND OF THE INVENTION

1. Field of the Invention

The present invention relates to a technique for transmitting/storing multi sub data in a system which consists of a plurality of sub processors and a single processor used as a base station subsystem of a digital cellular system.

2. Description of the Related Art

Generally, a digital cellular system used as code division multi access communication system consists of a base station subsystem(hereinafter, referred to as a BSS), and a mobile switching center(hereinafter, referred to as an MSC), and a home location register(hereinafter, referred to as an HLR). The BSS may comprise one base station manager (hereinafter, referred to as a BSM), a plurality of base station controllers(hereinafter, referred to as BSC), and a plurality of base station transceiver subsystems(hereinafter, referred to as BTS).

The BSM comprising a work station is installed in the whole system, and performs a loading of a call control processor(hereinafter, referred to as a CCP). A maximum of 12 CCPs are installed in one BSS, and each CCP performs the loading of 32 selector interface processors(hereinafter, referred to as SIPs) and 16 BTS control processors (hereinafter, referred to as BCPs). A maximum of 384 SIPs are installed in one BSS, and each SIP performs the loading of 4 SVPs. A maximum of 192 BCPs are installed in one BSS, each BCP performs the loading of 24 CIPs, one BTP, six pairs of TIPs and a pair of T Ps.

In the BSS of the digital cellular system, the BSS consists of a hierarchical structure of a main processor, medium processor and sub processor. The medium processor(BSC) loads and receives its own program and data from the main processor(BSM). In addition, the medium processor(BSC) loads and receives program and data to be loaded into the sub processor(BTS) upon executing an application, and then stores the loaded and received program and data in a memory. The medium processor(BSC) performs a procedure of loading the loaded and received program and data into the sub processor when it receives a loading request from the sub processor(BTS).

The BSM used as a main processor in the digital cellular system is a system for managing a plurality of medium processors BSC and sub processors BTS. The BSM combines and analyzes various data corresponding to events generated in each of a plurality of base stations. Several kinds of multi data to be processed by the BSM are data to be transmitted from a plurality of base stations. Accordingly, it requires that sub data transmitted from the base station are controlled efficiently.

The following references each disclose features in common with the present invention but do not teach or suggest the specifically recited technique for transmitting/storing multisub data of the present invention.

U.S. Pat. No. 5,621,753 to Weber, entitled Digital Communication System And A Primary Station For Use In Such A System, U.S. Pat. No. 5,576,945 to McCline et al., entitled Transaction Monitor Process With Pre-Arranged Modules For A Multiprocessor System, U.S. Pat. No. 5,537,639 to Matsumoto et al., entitled Method Of Communicating Between CPUs Within A Copying Machine With Transmitting And Receiving Buffers Divided Into Control Flag Area And Data Area, and U.S. Pat. No. 5,530,848 to Gilbert et al., entitled System And Method For Implementing An Interface Between An External Process And Transaction Processing system.

SUMMARY OF THE INVENTION

It is an object of the present to provide a technique for efficiently transmitting/storing multi sub data in a system comprised of a plurality of sub processors and a single main processor.

It is another object of the present invention is to provide a method for transmitting multi sub data without a time delay upon transmitting multi sub data to a single main processor.

It is still another object of the present invention to provide a method in which a single main processor receives and stores sub data transmitted from a plurality of sub processors without an error.

It is further still another object of the present invention to provide a method for sequentially controlling sub data from a plurality of sub processors connected to a single main processor in a transmission sequence.

To accomplish these and other object according to the present invention, there is provided a data transmitting/storing device of a system having a plurality of sub processors and a single processor comprising: a plurality of sub processors; a ready queue for temporarily keeping given data waiting in sequence; a buffering process for separating only pure data from the given data; a control process for temporarily keeping waiting sub data transmitted from sub processors in the ready queue, and reading out the waiting sub data in transmission sequence, thereby providing the buffering process with the read-out sub data; a disk for storing data therein; a storing process for classifying and storing in the disk only pure data separated by the buffering process of the sub processors.

According to the first aspect of the present invention, sub processors for transmitting multi sub data to a single main processor are characterized in that the sub processors collect sub data to be transmitted, and transmit the collected sub data to the single main processor when the transmission ready has been completed or when a predetermined time has passed. Also, when the single main processor requires the sub processors to transmit the collected sub data, the sub processors transmits the collected sub data to the single main processor.

According to the second aspect of the present invention, a single main processor for receiving sub data transmitted from a plurality of sub processors is characterized in that when the sub data is received from the sub processors, the single main processor keeps sub data waiting temporarily, and stores the sub data in a given data bank in a reception sequence. The sub data are stored in the data bank in a file form such that each sub data can be distinguished from each other.

According to the third aspect of the present invention, a method for transmitting and storing sub data from a plurality of sub processors connected to the single main processor, comprises: a first step in which the sub processors respectively collect the sub data to be transmitted, and transmit the collected sub data to the single main processor when the transmission ready has been completed or when the predetermined time has passed; and a second step in which the single main processor temporarily keeps the sub data waiting, and stores the sub data in a given data bank when the single main processor receives multi sub data from the sub processors. The sub processors respectively transmit the collected sub data to the single main processor even when the single main processor requires the collected sub data to be transmitted. Also, the single main processor stores the sub data in the data bank in a file form so that the multi sub data can be classified as to whether or not each of the multi sub data corresponds to one of the sub processors.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A detailed description has been omitted for related functions or constructions known to these skilled in the art so that it does not make the subject matter of the present invention unclear. Since the following terms have been defined considering their functions according to the present invention can be changed by an object or practice of a user or chip designer, their definition should be made on the basis of the subject matter of present invention.

Figure 1:
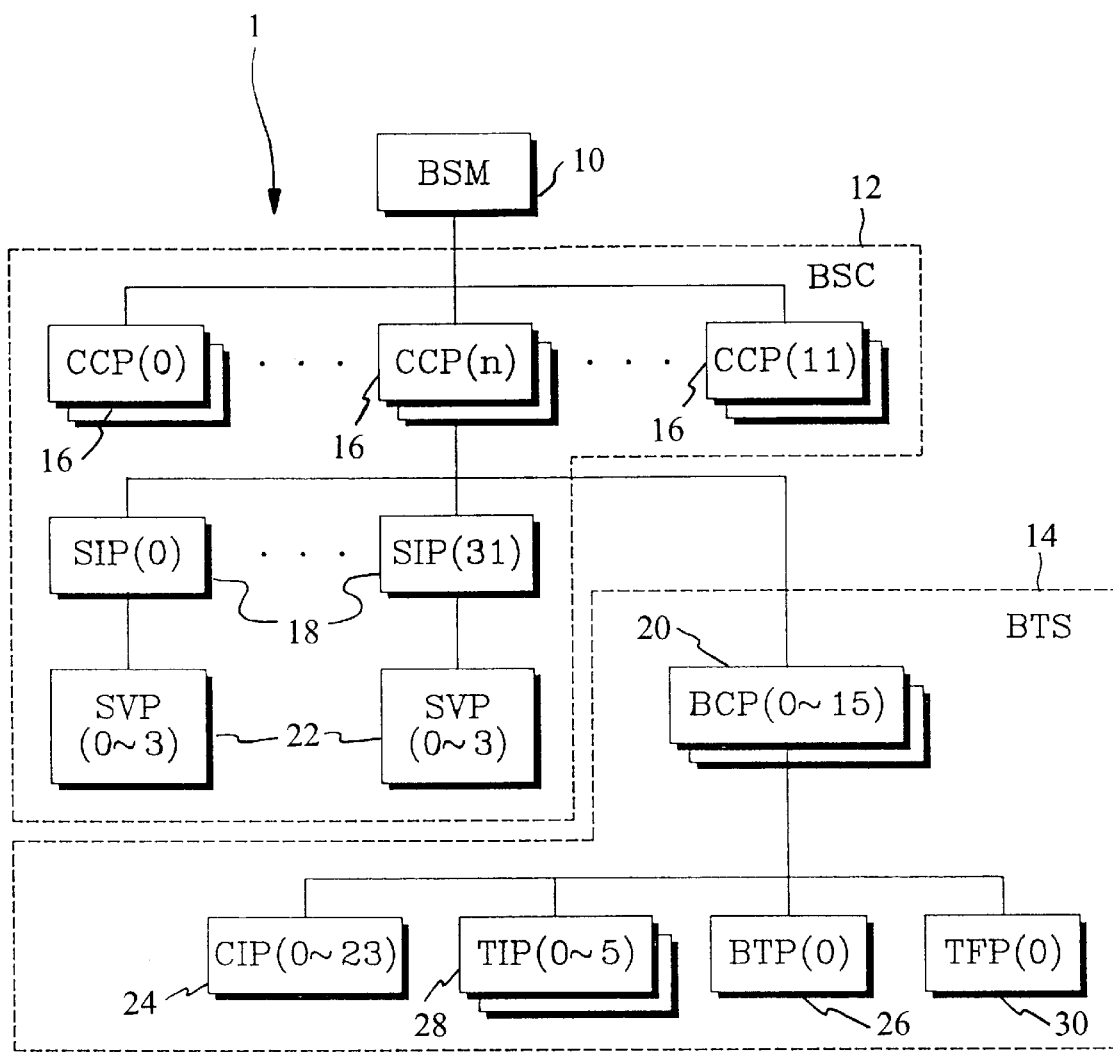
FIG. 1 is a block diagram illustrating a construction of a digital cellular system.

FIG. 1 illustrates the hierarchical processor arrangement for digital cellular system used as a code division multi-access communication system.

A digital cellular system may be constructed with a base station 1 (BSS), a mobile switching center (MSC) (not shown), and a home location register (HLR) (not shown). As shown in FIG. 1, base station 1 may be constructed with a base station manager 10 (BSM), a base station controller 12 (BSC), and a base station transceiver subsystem 14 (BTS). Typically, a digital cellular system contains one BSM 10 which is composed of work stations (not shown). The BSM loads call control processors 16 (CCPs). The BSC 12 is equipped with a maximum of twelve CCPs 16. One CCP 16 can load a maximum of thirty-two selector interface processors 18 (SIPs) and a maximum of sixteen BTS control processors 20 (BCPs). Therefore the BSS 1 is equipped with a maximum of three hundred eighty four SIPs 18. One SIP 18 can load a maximum of four selector vocoder processors 22 (SVP). The BSS 1 is equipped with a maximum of one hundred ninety two BCPs 20. One BCP 20 loads a maximum of twenty four control inter-working processors 24 (CIP), one BTS test processor 26 (BTP), six pairs of transceiver interface processors 28 (TIP), and one pair of time and frequency processors 30 (TFP).

FIG. 1 also illustrates a loading operation executed in BSS of a digital cellular system. The BSS has a hierarchical structure made up of upper, intermediate, and lower processors. An intermediate processor, such as a CCP 16, an SIP 18, or a BCP 20, receives its programs and data from an upper processor, such as a BSM 10 or a CCP 16, through a loading operation. The intermediate processor also stores programs and data which are loaded from an upper processor and loads them into lower processors during the execution of an application. If a lower processor requires loading by an intermediate processor, the intermediate processor receives and stores the program or data and then loads it into the lower processor. Note an intermediate processor such as a CCP 16 may play the role of an upper processor for processors on lower levels of the hierarchical structure, and it may also play the role of a lower processor with respect to processors on a higher level of the hierarchy.

This information transfer is established through physical communication channels, and as a consequence external interference or other factors can cause information losses or errors in the loading operation.

Figure 2:
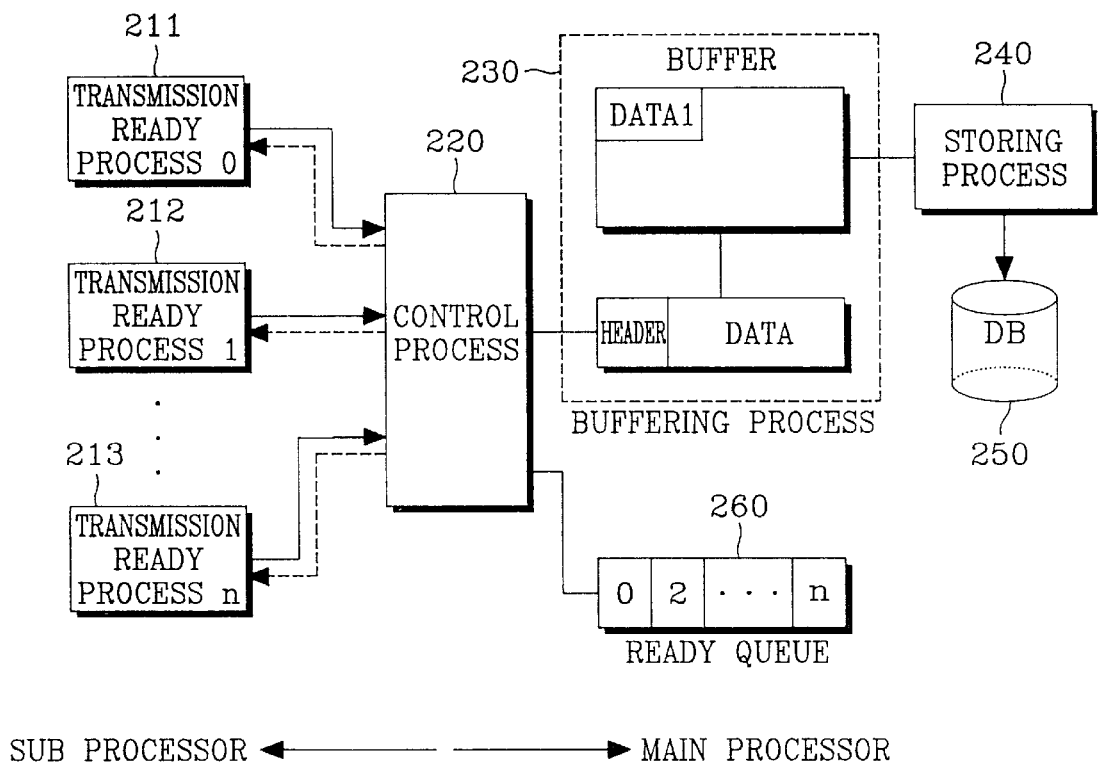
FIG. 2 is a block diagram illustrating a construction of a data transmitting/storing device according to the present invention.

FIG. 2 is a block diagram illustrating a construction of a data transmitting/storing device according to the present invention. It should be noted that such a data transmitting/storing device can be applied to the digital cellular system shown in FIG. 1. When the data transmitting and storing device of the present invention is applied to the digital cellular system, transmission ready processes 211 to 213 correspond to the BTS of FIG. 1, the control process 220 corresponds to the BSC of FIG. 1, the buffering process 230, the storing process 240, the data bank 250 and the ready queue 260 correspond to the BSM of FIG. 1.

Referring to FIG. 2, the data transmitting/storing device according to the present invention at least comprises: the transmission ready processes 211 to 213 for transmission; the control process 220 for transmission control; the buffering process 230 for extracting necessary data from the transmitted data and; the storing process 240 for storing the transmitted data in a disk 250. Also, the data transmitting/storing device according to the present invention further comprises a ready queue 260 for temporarily keeping waiting the data transmitted from the transmission ready processes 211 to 213 in transmission sequence. In view of the hierarchical structure of the system, the transmission ready processes 211 to 213 correspond to the sub processors of the system, and the control process 220, the buffering process 230, the storing process 240, the data bank 250 and the ready queue 260 correspond to the single main processor.

Figure 3:
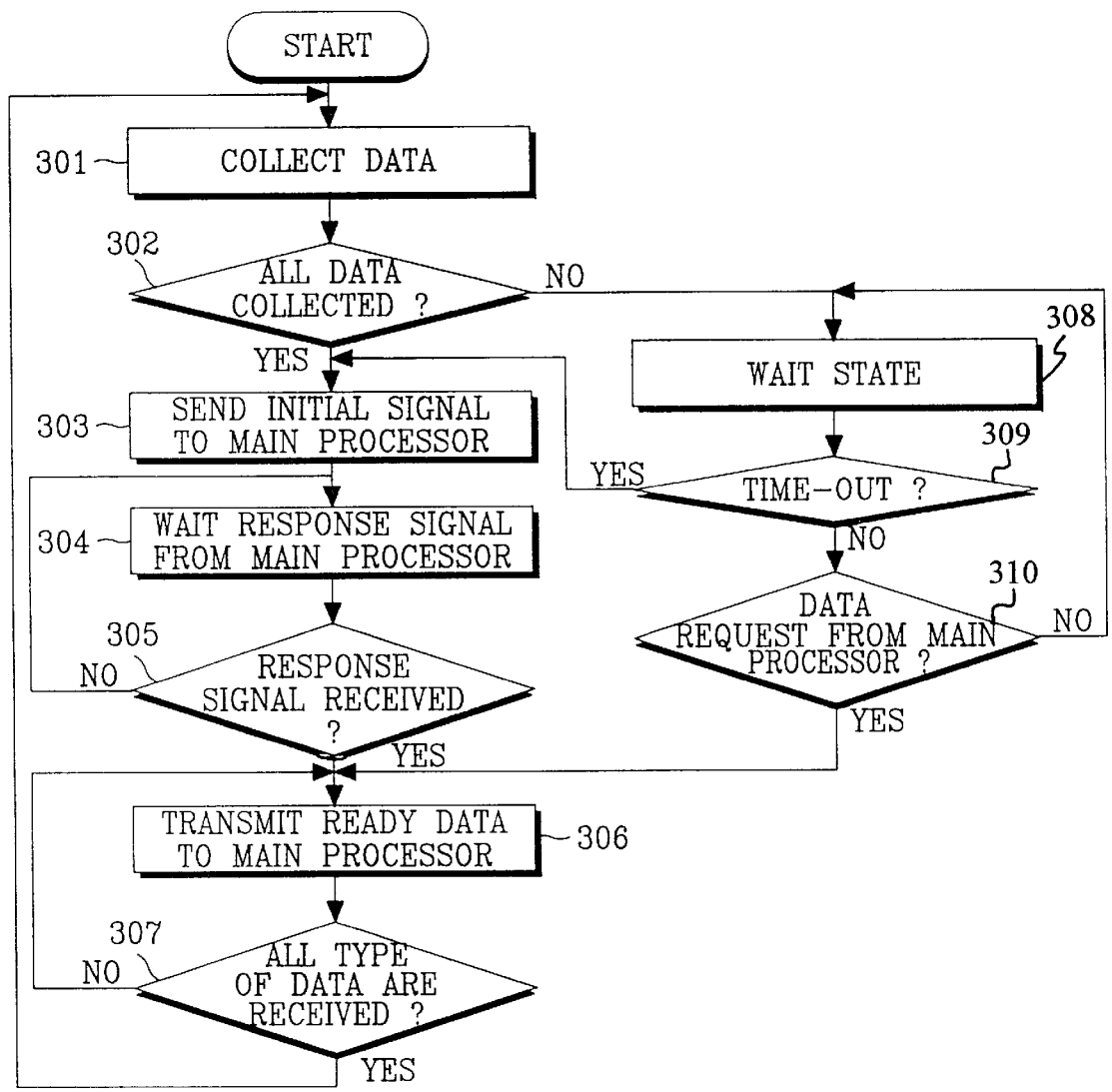
FIG. 3 is a flowchart illustrating an operation of sub processors according to the present invention.
Figure 4:
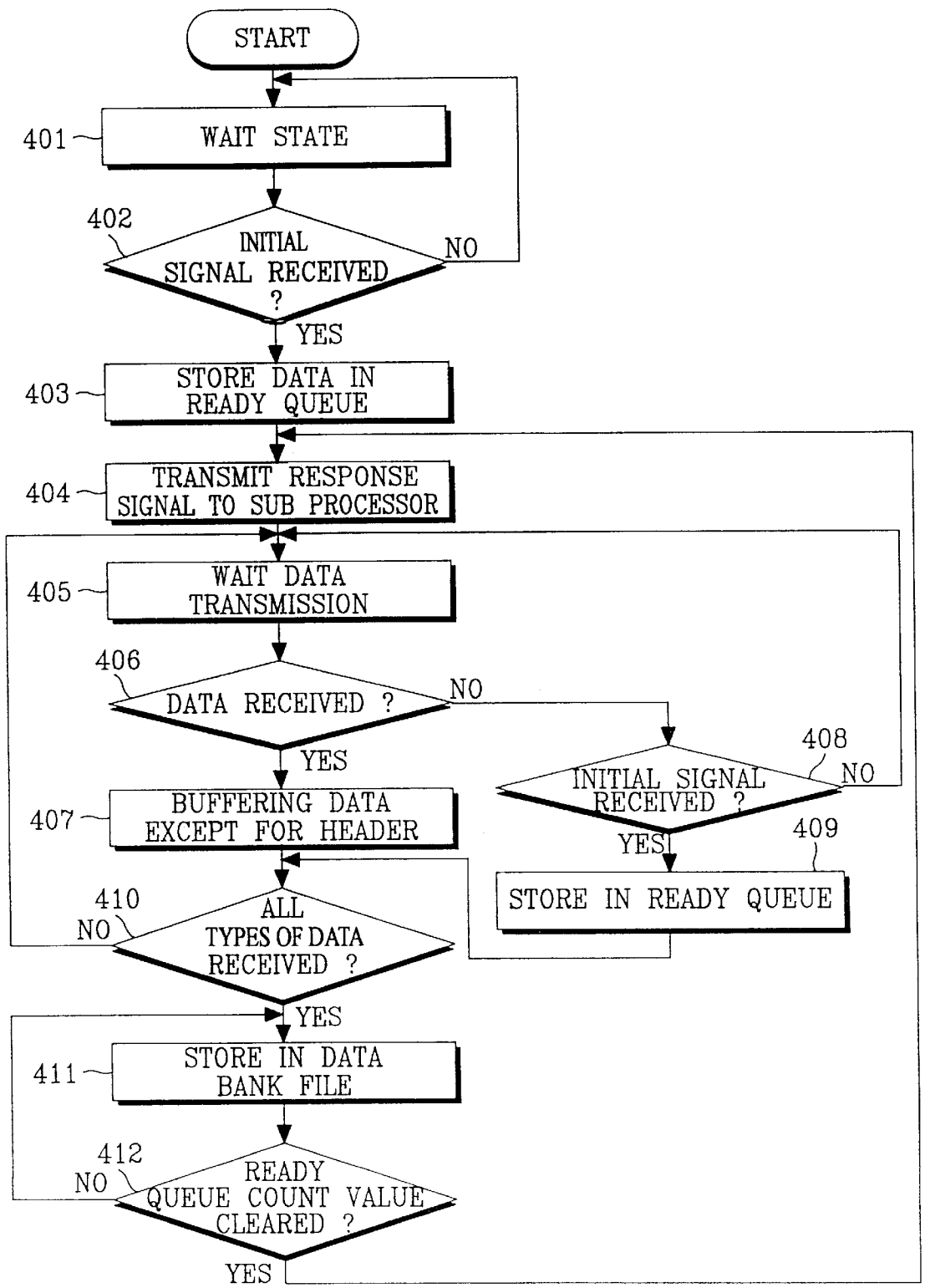
FIG. 4 is a flowchart illustrating an operation of a single main processor according to the present invention.

FIG. 3 is a flowchart illustrating the operation of the sub processors according to the present invention, and FIG. 4 is a flowchart illustrating the operation of the single main processor according to the present invention.

Referring to FIGS. 3 and 4, the operation according to the present invention will be described as follows.

In step 301, the sub processors require a smaller size of system to transmit data therefrom, and remains in a wait state until the corresponding data is received from the smaller size of system. Then, if it has been determined that all of the data has been collected in step 302, the sub processors send the single main processor an initial signal, thereby informing it that the transmission ready has been completed. In the meantime, even though it has been determined that all of the data has not been collected in the step 302, the sub processors do not continue to wait for data without limit. That is, upon a corresponding waiting time reaching a given time-out in steps 308 and 309, the sub processors send the initial signal to the single main processor.

If the initial signal is transmitted from the sub processor, the single main processor, being in a wait state(step 401), sends the sub processors a response signal indicating that a data reception ready is completed in step 404. Then, the sub processors from which the initial signal has been transmitted identify the response signal sent from the single main processor in steps 304 and 305, and transmit the ready data to the single main processor in step 306. Accordingly, the single main processor collects the data only from the corresponding sub processors. In step 407, the buffering processor 230 extracts only pure data without a header from among the collected data, and stores the extracted pure data in the buffer. If it has been determined that all types of data have been received in step 410, the storing process 240 stores the pure data stored in the buffer in the data bank in step 411. A hard disk can be used as the data bank 250.

In the meantime, if the initial signal showing that the transmission ready has been completed is also sent from other sub processors during the above operation, information of the initial signal is stored in the ready queue 260 by the single main processor for processing the initial signal at a next time.

After the data transmitted from any of the sub processors is stored in the data bank 250, the main processor performs the above operation for all of the sub processors transmitting data. That is, the single main processor sequentially reads out the information stored in the ready queue 250, thereby receiving the sub data from the corresponding sub processor, and stores the received sub data therein. In the above operation, if it has been determined that a count value of the ready queue 250 corresponds to zero in step 412, the main processor receives and stores the sub data from all of the sub processors, from which the initial signal has been transmitted.

In the meantime, the single main processor performs the operation of receiving the collected data by the sub processor from which the initial signal has not yet been transmitted. That is, the single main processor transmits a request signal to the sub processor from which the initial signal has not yet been transmitted, and then repeats the above operation, thereby receiving the sub data of the remaining sub processors and stores the received sub data in the data bank 250.

Figure 5:
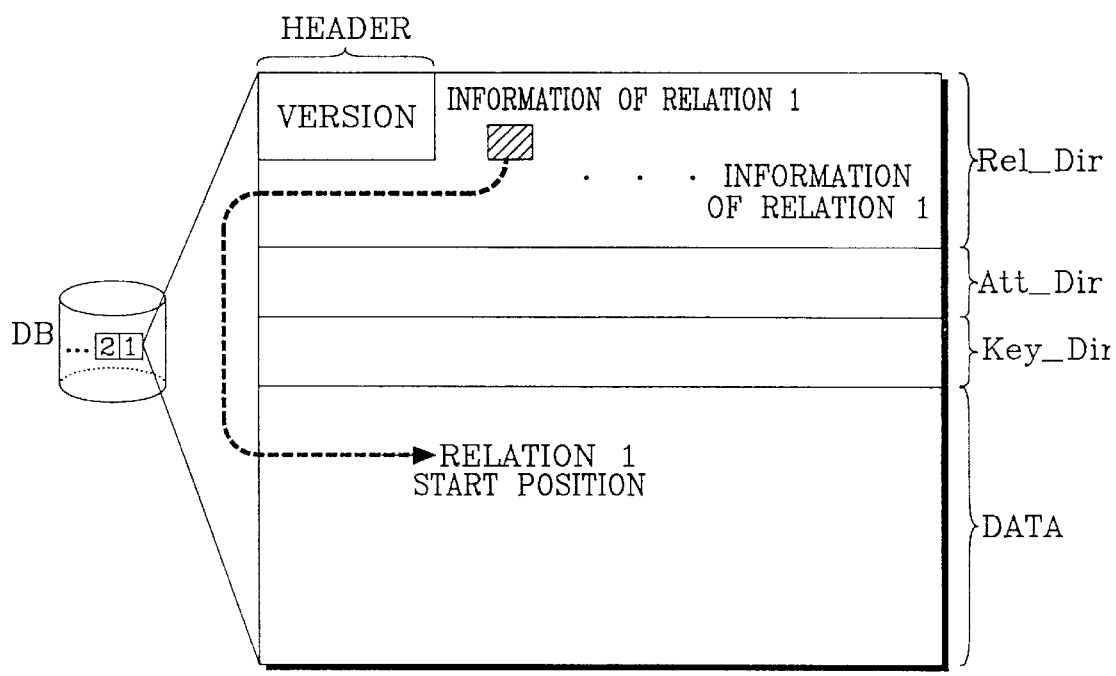
FIG. 5 is a schematic diagram illustrating a structure in which data transmitted from each of sub processors are stored in a data bank of FIG. 2.

FIG. 5 is a view illustrating the structure in which data transmitted from each of sub processors is stored in the data bank of FIG. 2. The file according to the above structure is for each of the sub processors.

The storing process 240 records the collected sub data on the file having the structure as shown in FIG. 5. Since the information for each relation is at a start position of the file, the storing process 240 accesses the start position of the file, thereby obtaining an offset value of the corresponding relation and then obtaining the start position thereof. Then, the offset position of corresponding tuple is added to the start position, thereby obtaining an address showing the location of the sub data to be accessed. The offset value of the corresponding tuple is obtained by equation (1) below, and the address of the access position is obtained by equation (2) below. At this time, key 1 and key 2 are assumed to be used.

$$\text{offset} = [\text{key 1} \times \text{Max}[\text{key 2}] + \text{key 2}] \times \text{tuple\_size} \quad (1)$$

$$\text{address of access position} = \text{start position of relation} + \text{offset of corresponding tuple} \quad (2)$$

As mentioned above, the present invention has advantages in which multi data transmitted from the sub processors can be sequentially stored in the single main processor in transmission sequence and the request signal is sent to the sub processor, from which data have not yet been transmitted, thereby preventing data loss. In addition, a time-out of appropriate value is provided, so that overall processing can be prevented from being delayed due to an unlimited wait state of the sub processors. In addition, the sub data is stored as a separate file by each of the sub processors, so that the sub data can be prevented from being lost.

Other modification and variations to the invention will be apparent to those skilled in the art from the foregoing disclosure and teaching. Thus, while only certain embodiments of the invention have been specifically described herein, it will be apparent that numerous modification may be made thereto without departing from the spirit and scope of the invention.

What is claimed is:

1. A data transmitting/storing device comprising:

a plurality of sub processors;

a ready queue for temporarily keeping given data waiting in sequence;

a buffering processor for separating only pure data without headers from said given data;

a control processor for temporarily keeping waiting sub data transmitted from said sub processors in said ready queue, and reading out said waiting sub data in a transmission sequence, thereby providing said buffering processor with said read-out sub data;

a disk for storing data therein; and a storing processor for classifying only pure data without headers separated by said buffering process of said sub processors and storing the classified pure data without headers on said disk.

2. The data transmitting/storing device as claimed in claim 1, further comprising:

said storing processor classifying said pure data without headers by using data other than said pure data without headers separated by said buffering processor, and storing said separated pure data without headers on said disk by said sub processor.

3. A method of transmitting and storing data comprising the steps of:

providing a plurality of sub processors;

temporarily keeping given data waiting in sequence in a ready queue;

separating only pure data without headers from said given data in a buffering processor;

temporarily keeping waiting sub data transmitted from said sub processors in said ready queue, and reading out said waiting sub data in a transmission sequence with a control processor, thereby providing said buffering processor with said read-out sub data; and classifying only pure data without headers separated by said buffering process of said sub processors and storing the classified pure data without headers on a disk.

4. The method as claimed in claim 3, further comprising:

classifying said pure data without headers by using data other than said pure data without headers separated by said buffering processor, and storing said separated pure data without headers on said disk by said sub processor.

* * * * *